Dec. 2, 1958   J. J. CHRISTENSON ET AL   2,862,635
STRADDLE CARRIER
Filed Jan. 2, 1958   2 Sheets-Sheet 1

INVENTORS
JAMES JULIUS CHRISTENSON
FREDERICK G. MALONEY
BY
Jesse P. Whann
ATTORNEY

INVENTORS
JAMES JULIUS CHRISTENSON
FREDERICK G. MALONEY
BY
ATTORNEY

United States Patent Office 2,862,635
Patented Dec. 2, 1958

2,862,635

STRADDLE CARRIER

James Julius Christenson, Cowiche, and Frederick G. Maloney, Yakima, Wash.; said Maloney assignor to Edwards Equipment, Yakima, Wash., a corporation of Washington Application January 2, 1958, Serial No. 706,803

16 Claims. (Cl. 214—392)

This invention relates to vehicles for transportation over public roads and relates in particular to a wheeled vehicle of the straddle type adapted to be moved into a position over the load which is to be transported, and having simple means for picking up the load so that it may be carried over roadways to a desired point of delivery.

It is an object of the invention to provide a straddle carrier which may be operated over public roads at the highest speeds permitted by law for trucks. The invention is especially useful where the load is of such character that it must be transported in a minimum of time from the loading place to the destination. In the fruit growing areas, for example, the rapid handling and transportation of fruit after it has been picked is of real importance. It enables picking of the fruit in riper state, and therefore, of better flavor and sugar content. If the fruit is to be canned or preserved, the present invention makes possible its rapid transportation from the orchard to the packing plant, and, if the fruit is to be sold fresh in the markets, it may be picked in nearly ripe condition and then transported quickly from the orchard to the refrigerated rooms or railroad cars of the distributor minimizing the possibility of spoilage.

It is an object of the invention to provide a straddle carrier which is of relatively minimum width and height for the size of the load which it is capable of carrying, and which may be used as a trailer vehicle connected to a motorized vehicle, for example, a semi-trailer where the load of the front end of the trailer is carried by the motorized vehicle.

It is the object of the invention to provide a straddle carrier of this type having simple and effective mechanism for picking up the load to be transported, which mechanism is arranged in or upon the side walls of the frame of the carrier devise and has no projecting parts. The straddle carrier, therefore, in addition to being relatively light in weight, comes within the height and width dimensions provided by law for trucks which may be used upon public roads. The mechanism of the device is such that the operations of picking up the load, transporting it to a destination and unloading it are facilitated.

Further objects and advantages of the invention may be brought out in the following part of the specification wherein some small details have been described for the purpose of providing a complete and easily understood disclosure without, however, intending to limit the scope of the invention which is defined by the accompanying claims.

Referring to the accompanying drawings which are for illustrative purposes only:

Fig. 3 is an enlarged fragmentary sectional view taken as indicated by the line 3—3 of Fig. 1;

Figure 1:
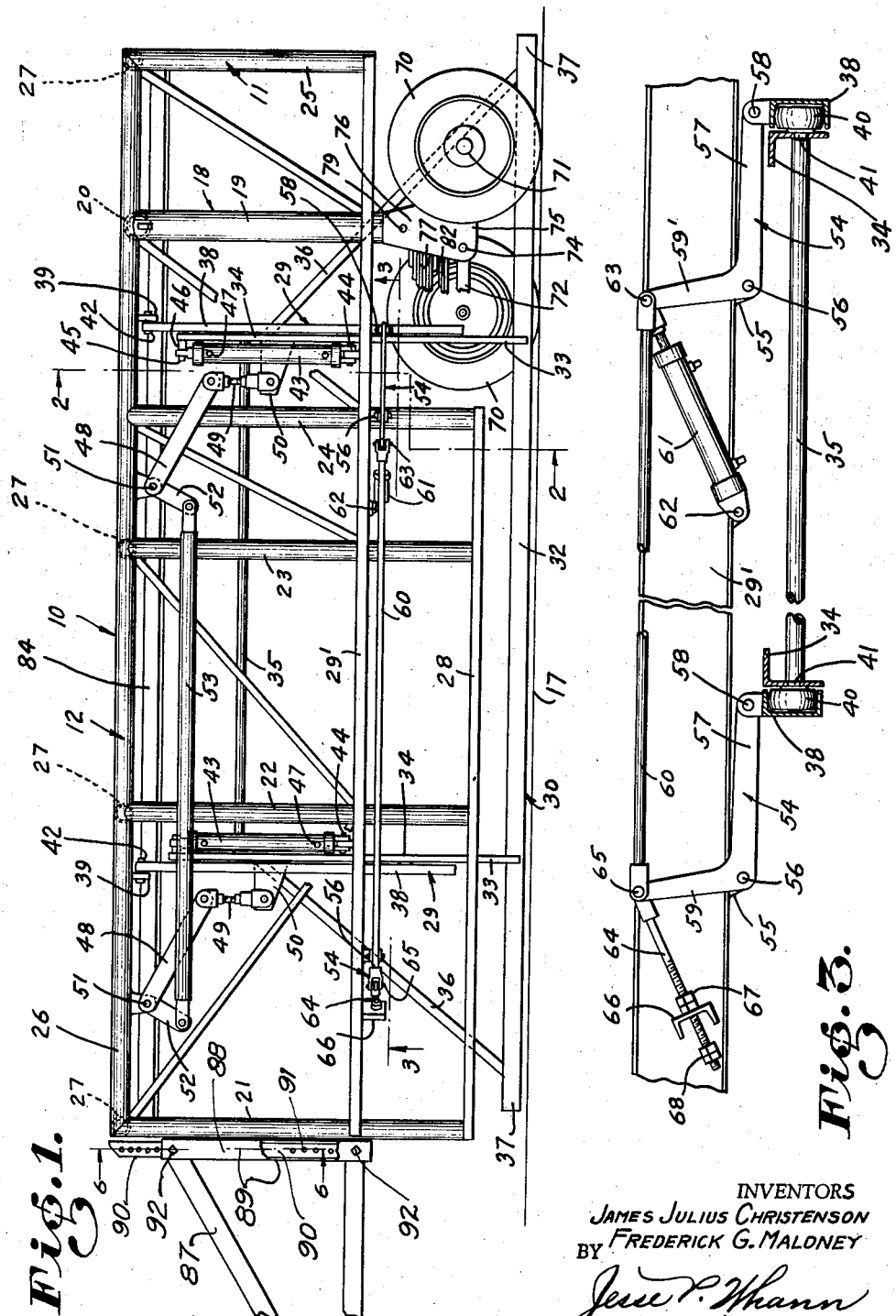
Fig. 1 is a side elevation of a preferred form of the invention, a small portion of which is broken away to show underlying details.

For convenience the body of the trailer is referred to as a frame 10. Although of open-work construction, the frame 10, as shown in Figs. 1 and 2 comprises parallel vertical side walls 11 and a horizontal top wall 12 defining a longitudinally elongated chamber 13 open along its bottom and at its rear end, so that the trailer may be backed into a position to surround or enclose a load shown in Fig. 2 as consisting of a pile of boxes 14 stacked on pallets 15 which are supported on longitudinal stringers 16 resting upon a road surface or floor 17 which may be the ground in an orchard.

The frame 10 includes a main arch 18 consisting of a pair of heavy posts 19 made of steel pipes of comparatively large diameter, and a horizontal cross member 20 consisting of a pipe of substantially the same diameter as the post 19, the ends of the cross member 20 being welded to the upper ends of the posts 19 so that a strong arch is formed. The posts 19 are included in the side walls 11 of the frame 10 and the cross member 20 is included in the top wall 12.

Figure 2:
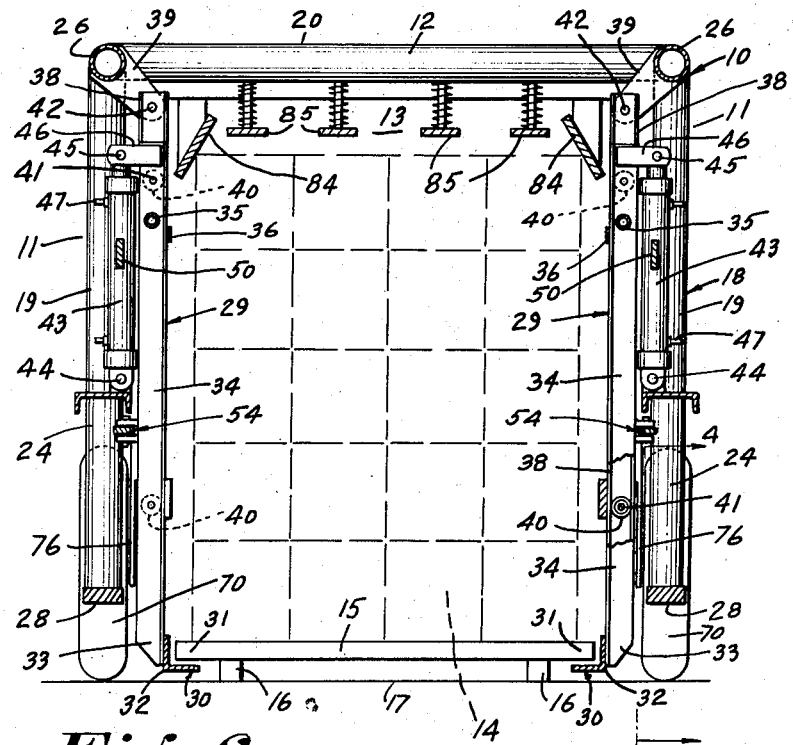
Fig. 2 is a cross-section, to enlarged scale, taken as indicated by the line 2—2 of Fig. 1.

As shown in Fig. 1, each side wall 11 includes studs 21, 22, 23, 24 and 25, the upper ends of which are welded to an upper horizontal beam 26. The members 21 through 26 consist of steel tubes. The beams 26 of the two side walls 11 in addition to forming the upper extremities of the side walls 11, also constitute the lateral extremities of the top wall 12. The beams 26 are welded to the upper ends of the posts 19 and also to the ends of the cross member 20, and these beams 26 are also connected by welding to a perimetry of cross members 27 which corroborate in forming the top wall 12 of the frame 10.

The side walls 11 also include a bottom beam 28 which is spaced above the ground as shown in Fig. 1 and is welded to the lower ends of the studs 21, 22, 23 and 24. Also, each side wall 11 includes a girt or intermediate horizontal beam 29, disposed between the upper and lower beams 26 and 28, extending full length of the frame 10, and being welded to the posts 19 and to the studs 21 through 25.

Lifters 29 are provided for lifting the load 14 from the position in which it is shown in Fig. 2, to elevate the pallets 15 sufficiently off the ground or floor 17 to permit the vehicle to be rolled away to carry the load to a selected destination. The lifters 29 include shelves 30 adapted to be moved into positions under the edges 31 of the pallets 15. These shelves 30 are the horizontally directed flanges of structural angles 32 which extend longitudinally of the frame 10, as shown in Fig. 1. The angle 32 of each lifter 29 is welded to the lower ends 33 of vertical bars 34 which, as shown in Fig. 3, are made from lengths of structural angles. The upper portions of the bars 34 are connected by a horizontal tubular bar 35, and diagonal braces 36 connect the end portion 37 of the angle 32 with upper portions of the bars 34.

The lifters 29 are guided in vertical movement by guides 38 which are suspended from brackets 39 effecting pivotal connection of the upper end of the guides with the upper ends of the frame side walls 11. As shown in Fig. 3, the guides 38 are channels adapted to receive rollers 40 mounted on studs 41 which project from the adjacent faces of the bars 34, enabling vertical movement of the lifter 29 along the parallel guides 38. The upper ends of the guides 38 are connected by hinges 42 to the brackets 39, permitting the lower ends of the lifters 29 to be swung toward the longitudinal center line of the chamber 13, to bring the angles 32 into engagement with the edges 31 of the pallets while the shelves 30 extend under the edges 31 in positions to lift the load 13 when the lifters 29 are moved upwardly from the positions in which they are shown in Fig. 2.

For effecting vertical movement of the lifters 29, pairs of hydraulic jack motors 43 are arranged vertically in the side walls 11, with their lower ends connected by hinge elements 44 to the upper faces of the girts 29' and with their upper ends connected by hinge pins 45 to brackets 46 which extend outwardly from the upper ends of the lifter bars 34. These jack motors 43 each consist of a cylinder and double acting piston, the cylinders being provided with hydraulic connections 47 adapted for connection to the hydraulic hoses, not shown, of a hydraulic system for operation of the hydraulic parts of the device.

The vertical movements of the lifters 29 are correlated by levers 48. There are four levers 48, such as shown in Fig. 1, and the swinging end of each lever 48 is connected by a vertical link 49 with a bracket 50 which extends from the upper portion of a lifter bar 34. The levers 48 are fixed on the end portions of transverse shafts 51 which extend across the upper portion of the frame 10. The shafts 51 are connected for identical rotation by linkage consisting of levers 52 which are fixed on the shafts 51 and have their swinging ends terminally connected to the ends of a link 53. As the hydraulic jacks 43 apply vertical movements to the lifters 29, these vertical movements are correlated through the interlinked levers 48 so that the shelves 30 will be maintained level.

Bell cranks 54 are employed in pairs, as shown in Figs. 1 and 3, for swinging the lower ends of the lifters 29 toward and away from the longitudinal center line of the chamber 13. These bell cranks 54 are connected by brackets 55 to the girts 29' so as to be swung in horizontal planes around vertical pivots 56. The longitudinal lever arms 57 of the bell cranks 54 are connected by hinge means 58 with the pair of guides 38, and by swinging of the bell cranks 54 it is possible to simultaneously swing the guides 38. The arms 59 and 59' of the bell cranks 54 are connected by a link 60 which is adapted to be shifted longitudinally by a hydraulic motor 61 having one end thereof connected by a pin 62 to the girt 29', and having its other end connected by a pin 63 to the crank arm 59' of the adjacent end of the link 60.

There are two sets of bell cranks 54 and associated connections as described, one set on each side of the frame 10 for simultaneous movement of the guides 38. The hydraulic jack motors 61 are of double acting type, and by back and forth movement of the bell cranks 54 they effect a back and forth swinging of the guides 38 on the hinges 42 so that the shelves 30, Figs. 1 and 2, may be moved under or removed from the edges 31 of the pallets 15. The invention also provides means for limiting the swinging movement of the guides 38 so that the angles or load engagers 32 will be swung inwardly through equal distances, thereby centering the load 14 in the chamber 13. This consists of an adjustable stop for the swinging movements of the bell cranks 54, consisting of a bar 64 having one end connected by a hinge pin 65 at the outer end of the lever 59 and the forward end of the link 60 and having the opposite end portion thereof threaded and extended through a bracket 66 which projects from a face of the girt 29'. Nuts 67 and 68, threaded and backed on the bar 64, engage the bracket 66, and therefore limit the inward and outward movements of the load engagers 32.

Figure 4:
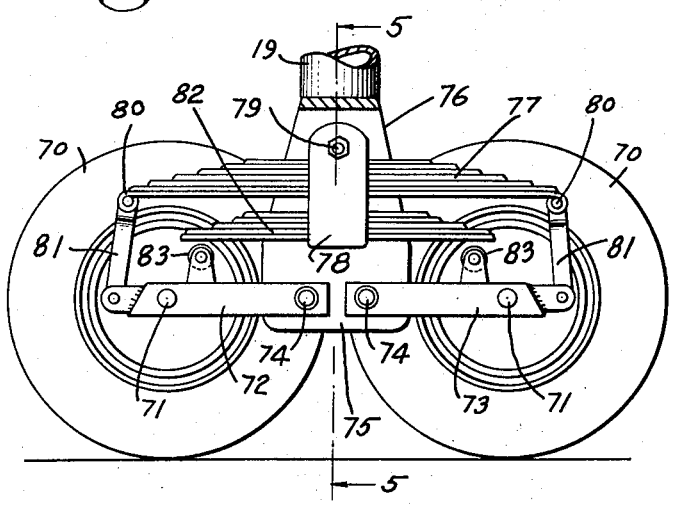
Fig. 4 is an enlarged fragmentary sectional view taken as indicated by the line 4—4 of Fig. 2, showing one set of trailer wheels and supports therefor.
Figure 5:
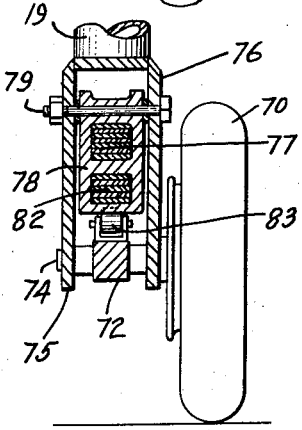
Fig. 5 is a sectional view taken as indicated by the line 5—5 of Fig. 4.

Tandem wheels 70, for supporting the frame 10, are connected to the lower ends of the posts 19 which, as shown in Figs. 1 and 2, cooperate with the transverse beam member 20 in forming a rigid arch for supporting the rearward portion of the frame 10. As shown in Figs. 4 and 5, the wheels 70 are supported on axles 71 which extend horizontally from the ends of forwardly and rearwardly extending lever arms 72 and 73 which are swingable vertically on horizontal hinge pins 74 and supported by the plates 75 of a bracket 76 which is welded onto the lower end of the associated posts 19. A main leaf spring member 77 has its central portion connected by a block 78 to a horizontal pin 79 mounted in the bracket 76, so that the hinge 80 of the spring member 77 may swing up and down around the axis of the pin 79. The ends 80 of the spring member 77 are connected by approximately vertical links 81 with the swingable ends of the lever arms 72 and 73 so that the load from the wheels 70 will thereby be transmitted to the main spring member 77 during normal conditions of road operation. An overload leaf spring 82 is disposed below the main spring member 77 and has its central portion supported by the block 78.

Bumper rollers 83 are mounted near the ends of the lever arms 72 and 73 for engagement with the end portions of the overload spring member 82 when overload conditions of operation are encountered. Except for their inner connections through the spring 77 the wheel axles 71 are independently vertically swingable by encountered road conditions and, therefore, a minimum of road shock and vertical movement are transmitted from the wheels 70 to the frame 10 and the load carried thereby.

For stabilizing the upper part of the load 14 when it is raised within the chamber 13, longitudinal strips 84 and 85 are supported in the top of the chamber 13. The strips 85 are supported so that they may yield upwardly when engaged by the rising load, and the strips 84 are disposed in diagonal planes, shown in Fig. 2, so that the corner portions of the load will be engaged thereby and restrained from lateral movement.

At the front end of the frame 10 there is a forwardly projecting bracket 87, Fig. 1, for connection to the rearward portion of a motorized vehicle, not shown, so that the load of the front end of the straddle carrier is thereby transmitted to the wheels of the motorized vehicle. The invention provides means of adjustment for raising and lowering the front end of the frame 10 with respect to the ground so that the shelves 30 of the lifters 29 can be levelled. This means of adjustment comprises an adjustable connection 88 between the bracket 87 and the front end of the frame 10, shown as consisting of vertical plates 89 connected to the studs 21 at the front end of the frame 10 and vertical bars 90 forming the rear portions of the bracket 87 and having vertically spaced openings 91 for selective engagement by bolts 92 which pass also through the vertical plates 89. The elevation of the bracket 87 is determined by the height of the coupler plate of the motorized vehicle. By shifting the plates 89 along the vertical bars 90 of the bracket 87 it is possible to raise and lower the front end of the frame 10 so as to bring the angles 32 level with the ground surface 17. By this arrangement we have provided a carrier in the form of a trailer which may be connected to any one of a number of vehicles having coupler plates disposed at different heights from the ground, the adjustable bracket connection 88 compensating for the differences in these devices.

We claim:

1. In a straddle carrier: a frame having top and side walls defining a chamber open at one end so that the frame may be moved over the load to be transported; wheels connected to said side walls, supporting said frame for movement over roads; vertical guide means disposed adjacent the inner faces of said side walls of said frame; hinge means connecting the upper ends of said guide means to the upper portions of said side walls so that the lower parts of said guide means may swing inwardly toward the central plane of said chamber; load lifter members vertically movable in said guide means and having means at the lower ends thereof for engaging the load; cylinder-piston motors arranged vertically on said side walls; means connecting opposite ends of said motors respectively to said side walls of said frame and to said lifter members; means for correlating the vertical movements of said lifter members; and means for moving said lifter members toward and away from the longitudinal center line of said chamber so as to bring said engagers into engagement with the load and to disengage them from the load.

2. In a straddle carrier: a frame having top and side walls defining a chamber open at one end so that the frame may be moved over the load to be transported, said frame including a main arch comprising two post elements, disposed respectively in said side walls, and a transverse member connected to the upper portions of said post elements; wheels connected to the lower ends of said post elements, supporting said frame for movement over roads; vertical guide means disposed adjacent the inner faces of said side walls of said frame; hinge means connecting the upper ends of said guide means to the upper portions of said side walls so that the lower parts of said guide means may swing inwardly toward the central plane of said chamber; load lifter members vertically movable in said guide means and having means at the lower ends thereof for engaging the load; jack motors arranged vertically on said side walls; means connecting the opposite ends of said motors respectively to said side walls of said frame and to said lifter members; means for correlating the vertical movements of said lifter members; and means for moving said lifter members toward and away from the longitudinal center line of said chamber so as to bring said engagers into engagement with the load and to disengage them from the load.

3. In a straddle carrier: a frame having top and side walls defining a chamber open at one end so that the frame may be moved over the load to be transported, said frame including a main arch comprising two post elements, disposed respectively in said side walls, and a transverse member connected to the upper portions of said post elements; wheels connected to the lower ends of said post elements, supporting said frame for movement over roads; vertical guide means disposed adjacent the inner faces of said side walls of said frame; horizontal girts extending longitudinally of said side walls intermediate the upper and lower edges thereof; hinge means connecting the upper ends of said guide means to the upper portions of said side walls so that the lower parts of said guide means may swing inwardly toward the central plane of said chamber; load lifter members vertically movable in said guide means and having means at the lower ends thereof for engaging the load; jack motors arranged vertically on said walls; means connecting the opposite ends of said motors respectively to said girts of said frame and to said lifter members; means for correlating the vertical movements of said lifter members; and means for moving said lifter members toward and away from the longitudinal center line of said chamber so as to bring said engagers into engagement with the load and to disengage them from the load.

4. In a straddle carrier: a frame having top and side walls defining a chamber open at one end so that the frame may be moved over the load to be transported; wheels connected to said side walls, supporting said frame for movement over roads; vertical guide means disposed adjacent the inner faces of said side walls of said frame; horizontal girts extending longitudinally of said side walls intermediate the upper and lower edges thereof; hinge means connecting the upper ends of said guide means to the upper portions of said side walls so that the lower parts of said guide means may swing inwardly toward the central plane of said chamber; load lifter members vertically movable in said guide means and having means at the lower ends thereof for engaging the load; cylinder-piston motors arranged vertically on said side walls; means connecting the opposite ends of said motors respectively to said girts of said frame and to said lifter members; means for correlating the vertical movements of said lifter members; and means for moving said lifter members toward and away from the longitudinal center line of said chamber so as to bring said engagers into engagement with the load and to disengage them from the load.

5. In a straddle carrier: a frame having top and side walls defining a chamber open at one end so that the frame may be moved over the load to be transported, said frame including a main arch comprising two post elements, disposed respectively in said side walls, and a transverse member connected to the upper portions of said post elements; wheels connected to the lower ends of said post elements, supporting said frame for movement over roads; vertical guide means disposed adjacent the inner faces of said side walls of said frame; horizontal girts extending longitudinally of said side walls intermediate the upper and lower edges thereof; hinge means connecting the upper ends of said guide means to the upper portions of said side walls so that the lower parts of said guide means may swing inwardly toward the central plane of said chamber; load lifter members vertically movable in said guide means and having means at the lower ends thereof for engaging the load; jack motors arranged vertically on said side walls; means connecting the opposite ends of said motors respectively to said girts of said frame and to said lifter members; means for correlating the vertical movements of said lifter members; and means supported by said girts and extending longitudinally thereof for moving said lifter members toward and away from the longitudinal center line of said chamber so as to bring said engagers into engagement with the load and to disengage them from the load.

6. In a straddle carrier: a frame having top and side walls defining a chamber open at one end so that the frame may be moved over the load to be transported; wheels connected to said side walls, supporting said frame for movement over roads; vertical guide means disposed adjacent the inner faces of said side walls of said frame; horizontal girts extending longitudinally of said side walls intermediate the upper and lower edges thereof; hinge means connecting the upper ends of said guide means to the upper portions of said side walls so that the lower parts of said guide means may swing inwardly toward the central plane of said chamber; load lifter members vertically movable in said guide means and having means at the lower ends thereof for engaging the load; cylinder-piston motors arranged vertically on said side walls; means connecting the opposite ends of said motors respectively to said girts of said frame and to said lifter members; means for correlating the vertical movements of said lifter members; and means supported by said girts and extending longitudinally thereof for moving said lifter members toward and away from the longitudinal center line of said chamber so as to bring said engagers into engagement with the load and to disengage them from the load.

7. In a straddle carrier: a frame having top and side walls defining a chamber open at one end so that the frame may be moved over the load to be transported; wheels connected to said side walls, supporting said frame for movement over roads; vertical guide means disposed adjacent the inner faces of said side walls of said frame; hinge means connecting the upper ends of said guide means to the upper portions of said side walls so that the lower parts of said guide means may swing inwardly toward the central plane of said chamber; load lifter members vertically movable in said guide means and having means at the lower ends thereof for engaging the load; cylinder-piston motors arranged vertically on said side walls; means connecting the opposite ends of said motors respectively to said side walls of said frame and to said lifter members; transverse shafts extending across the upper part of said frame from side to side thereof and in spaced relation to upper portions of said lifter members; levers on the ends of said shafts connected to said lifter members; means connecting said shafts so that they will rotate simultaneously and said levers will rise and fall simultaneously; and means for moving said lifter members toward and away from the longitudinal center line of said chamber so as to bring said engagers into engagement with the load and to disengage them from the load.

8. In a straddle carrier: a frame having top and side walls defining a chamber open at one end so that the frame may be moved over the load to be transported; wheels connected to said side walls, supporting said frame for movement over roads; vertical guide means disposed adjacent the inner faces of said side walls of said frame; horizontal girts extending longitudinally of said side walls intermediate the upper and lower edges thereof; hinge means connecting the upper ends of said guide means to the upper portions of said side walls so that the lower parts of said guide means may swing inwardly toward the central plane of said chamber; load lifter members vertically movable in said guide means and having means at the lower ends thereof for engaging the load; cylinder-piston motors arranged vertically on said side walls; means connecting the opposite ends of said motors respectively to said girts of said frame and to said lifter members; transverse shafts extending across the upper part of said frame from side to side thereof and in spaced relation to upper portions of said lifter members; levers on the ends of said shafts connected to said lifter members; means connecting said shafts so that they will rotate simultaneously and said levers will rise and fall simultaneously; and means supported by said girts and extending longitudinally thereof for moving said lifter members toward and away from the longitudinal center line of said chamber so as to bring said engagers into engagement with the load and to disengage them from the load.

9. In a straddle carrier: a frame having top and side walls defining a chamber open at one end so that the frame may be moved over the load to be transported, said frame including a main arch comprising two post elements, disposed respectively in said side walls, and a transverse member connected to the upper portions of said post elements; wheels connected to the lower ends of said post elements, supporting said frame for movement over roads; vertical guide means disposed adjacent the inner faces of said side walls of said frame; horizontal girts extending longitudinally of said side walls intermediate the upper and lower edges thereof; hinge means connecting the upper ends of said guide means to the upper portions of said side walls so that the lower parts of said guide means may swing inwardly toward the central plane of said chamber; load lifter members vertically movable in said guide means and having means at the lower ends thereof for engaging the load; jack motors arranged vertically on said side walls; means connecting the opposite ends of said motors respectively to said girts of said frame and to said lifter members; transverse shafts extending across the upper part of said frame from side to side thereof and in spaced relation to upper portions of said lifter members; levers on the ends of said shafts connected to said lifter members; means connecting said shafts so that they will rotate simultaneously and said levers will rise and fall simultaneously; and means supported by said girts and extending longitudinally thereof for moving said lifter members toward and away from the longitudinal center line of said chamber so as to bring said engagers into engagement with the load and to disengage them from the load.

10. In a straddle carrier: a frame having top and side walls defining a chamber open at one end so that the frame may be moved over the load to be transported; wheels connected to said side walls, supporting said frame for movement over roads; vertical guide means disposed adjacent the inner faces of said side walls of said frame; horizontal girts extending longitudinally of said side walls intermediate the upper and lower edges thereof; hinge means connecting the upper ends of said guide means to the upper portions of said side walls so that the lower parts of said guide means may swing inwardly toward the central plane of said chamber; load lifter members vertically movable in said guide means and having means at the lower ends thereof for engaging the load; cylinder-piston motors arranged vertically on said side walls; means connecting the opposite ends of said motors respectively to said girts of said frame and to said lifter members; means for correlating the vertical movements of said lifter members; and means for moving said lifter members toward and away from the center line of said chamber comprising a pair of lever arms pivotally mounted on each of said girts so that the free ends thereof will swing toward and away from the center line of said chamber, means connecting the ends of said lever arms to said guide means so that swinging of said lever arms will swing said guide means, means connecting each pair of lever arms for simultaneous swinging movement, and power means operable to swing said lever arms.

11. In a straddle carrier: a frame having top and side walls defining a chamber open at one end so that the frame may be moved over the load to be transported, said frame including a main arch comprising two post elements, disposed respectively in said side walls, and a transverse member connected to the upper portions of said post elements; wheels connected to the lower ends of said post elements, supporting said frame for movement over roads; vertical guide means disposed adjacent the inner faces of said side walls of said frame; horizontal girts extending longitudinally of said side walls intermediate the upper and lower edges thereof; hinge means connecting the upper ends of said guide means to the upper portions of said side walls so that the lower parts of said guide means may swing inwardly toward the central plane of said chamber; load lifter members vertically movable in said guide means and having means at the lower ends thereof for engaging the load; jack motors arranged vertically on said side walls; means connecting the opposite ends of said motors respectively to said girts of said frame and to said lifter members; means for correlating the vertical movements of said lifter members; and means for moving said lifter members toward and away from the center line of said chamber comprising a pair of lever arms pivotally mounted on each of said girts so that the free ends thereof will swing toward and away from the center line of said chamber, means connecting the ends of said lever arms to said guide means so that swinging of said lever arms will swing said guide means, means connecting each pair of lever arms for simultaneous swinging movement, and power means operable to swing said lever arms.

12. In a straddle carrier: a frame having top and side walls defining a chamber open at one end so that the frame may be moved over the load to be transported, said frame including a main arch comprising two post elements, disposed respectively in said side walls, and a transverse member connected to the upper portions of said post elements; wheels connected to the lower ends of said post elements, supporting said frame for movement over roads; vertical guide means disposed adjacent the inner faces of said side walls of said frame; horizontal girts extending longitudinally of said side walls intermediate the upper and lower edges thereof; hinge means connecting the upper ends of said guide means to the upper portions of said side walls so that the lower parts of said guide means may swing inwardly toward the central plane of said chamber; load lifter members vertically movable in said guide means and having means at the lower ends thereof for engaging the load; jack motors arranged vertically on said side walls; means connecting the opposite ends of said motors respectively to said girts of said frame and to said lifter members; means for correlating the vertical movements of said lifter members; and means for moving said lifter members toward and away from the center line of said chamber comprising a pair of lever arms pivotally mounted on each of said girts so that the free ends thereof will swing toward and away from the center line of said chamber, means connecting the ends of said lever arms to said guide means so that swinging of said lever arms will swing said guide means, means connecting each pair of lever arms for simultaneous swinging movement comprising links extending along said girts, adjustable stop means for limiting the swinging movement of said lever arms and thereby limiting the inward and outward movement of said engagers of said lifter members, and power means operable to swing said lever arms.

13. In a straddle carrier: a frame having top and side walls defining a chamber open at one end so that the frame may be moved over the load to be transported, said frame including a main arch comprising two post elements, disposed respectively in said side walls, and a transverse member connected to the upper portions of said post elements; horizontal arms extending forwardly and rearwardly from the lower ends of said post elements of said main arch; hinge means connecting said arms to said post elements so that the ends thereof may swing upwardly and downwardly; wheels for the frame rotatably connected to said ends of said arms; spring means resisting upward movement of said ends of said arms; vertical guide means disposed adjacent the inner faces of said side walls of said frame; hinge means connecting the upper ends of said guide means to the upper portions of said side walls so that the lower parts of said guide means may swing inwardly toward the central plane of said chamber; load lifter members vertically movable in said guide means and having means at the lower ends thereof for engaging the load; jack motors arranged vertically on said side walls; means connecting the opposite ends of said motors respectively to said side walls of said frame and to said lifter members; means for correlating the vertical movements of said lifter members; and means for moving said lifter members toward and away from the longitudinal center line of said chamber so as to bring said engagers into engagement with the load and to disengage them from the load.

14. In a straddle carrier: a frame having top and side walls defining a chamber open at one end so that the frame may be moved over the load to be transported, said frame including a main arch comprising two post elements, disposed respectively in said side walls, and a transverse member connected to the upper portions of said post elements; horizontal arms extending forwardly and rearwardly from the lower ends of said post elements of said main arch; hinge means connecting said arms to said post elements so that the ends thereof may swing upwardly and downwardly; wheels for the frame rotatably connected to said ends of said arms; leaf spring means supported by the lower portions of said post elements in position above said arms; links connecting said spring means to said arms so that said spring means will resist upward movement of said wheels relative to said frame; vertical guide means disposed adjacent the inner faces of said side walls of said frame; hinge means connecting the upper ends of said guide means to the upper portions of said side walls so that the lower parts of said guide means may swing inwardly toward the central plane of said chamber; load lifter members vertically movable in said guide means and having means at the lower ends thereof for engaging the load; jack motors arranged vertically on said side walls; means connecting the opposite ends of said motors respectively to said side walls of said frame and to said lifter members; means for correlating the vertical movements of said lifter members; and means for moving said lifter members toward and away from the longitudinal center line of said chamber so as to bring said engagers into engagement with the load and to disengage them from the load.

15. In a straddle carrier: a frame having top and side walls defining a chamber open at one end so that the frame may be moved over the load to be transported, said frame including a main arch comprising two post elements, disposed respectively in said side walls, and a transverse member connected to the upper portions of said post elements; horizontal arms extending forwardly and rearwardly from the lower ends of said post elements of said main arch; hinge means connecting said arms to said post elements so that the ends thereof may swing upwardly and downwardly; wheels for the frame rotatably connected to said ends of said arms; leaf spring means supported by the lower portions of said post elements in position above said arms; links connecting said spring means to said arms so that said spring means will resist upward movement of said wheels relative to said frame; vertical guide means disposed adjacent the inner faces of said side walls of said frame; hinge means connecting the upper ends of said guide means to the upper portions of said side walls so that the lower parts of said guide means may swing inwardly toward the central plane of said chamber; load lifter members vertically movable in said guide means and having means at the lower ends thereof for engaging the load; jack motors arranged vertically on said side walls; power operated means connected to said lifters and to said frame for moving said lifters toward and away from the load; and power operated means for raising and lowering said lifters so as to raise and lower the load.

16. In a straddle carrier: a frame having top and side walls defining a chamber open at one end so that the frame may be moved over the load to be transported; wheels connected to said side walls, supporting said frame for movement over roads; vertical guide means disposed adjacent the inner faces of said side walls of said frame; hinge means connecting the upper ends of said guide means to the upper portions of said side walls so that the lower parts of said guide means may swing inwardly toward the central plane of said chamber; load lifter members vertically movable in said guide means and having means at the lower ends thereof for engaging the load; cylinder-piston motors arranged vertically on said side walls; means connecting opposite ends of said motors respectively to said side walls of said frame and to said lifter members; means for correlating the vertical movements of said lifter members; means for moving said lifter members toward and away from the longitudinal center line of said chamber so as to bring said engagers into engagement with the load and to disengage them from the load; a bracket at the front end of said frame for connecting it to a motorized vehicle; and means for adjustably connecting said bracket to said front end of said frame so that the front end of said frame may be raised and lowered to level the frame.

No references cited.

UNITED STATES PATENT OFFICE

CERTIFICATE OF CORRECTION

Patent No. 2,862,635 December 2, 1958

James Julius Christenson et al.

It is hereby certified that error appears in the printed specification of the above numbered patent requiring correction and that the said Letters Patent should read as corrected below.

Column 5, line 49, for "said walls" read -- said side walls --.

Signed and sealed this 10th day of March 1959.

(SEAL)
Attest:

KARL H. AXLINE
Attesting Officer

ROBERT C. WATSON
Commissioner of Patents